United States Patent
Varekamp

(10) Patent No.: US 11,416,983 B2
(45) Date of Patent: Aug. 16, 2022

(54) SERVER-CLIENT ARCHITECTURE IN DIGITAL PATHOLOGY

(71) Applicant: KONINKLIJKE PHILIPS N.V., Eindhoven (NL)

(72) Inventor: Christiaan Varekamp, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/752,921

(22) PCT Filed: Aug. 12, 2016

(86) PCT No.: PCT/EP2016/069255
§ 371 (c)(1),
(2) Date: Feb. 15, 2018

(87) PCT Pub. No.: WO2017/032621
PCT Pub. Date: Mar. 2, 2017

(65) Prior Publication Data
US 2018/0240231 A1    Aug. 23, 2018

(30) Foreign Application Priority Data
Aug. 24, 2015  (EP) ..................... 15182141

(51) Int. Cl.
*G06T 7/00*  (2017.01)
*G06T 7/90*  (2017.01)
(Continued)

(52) U.S. Cl.
CPC .............. *G06T 7/0012* (2013.01); *G06T 7/90* (2017.01); *G06V 10/25* (2022.01); *G06V 20/695* (2022.01); *H04L 67/42* (2013.01)

(58) Field of Classification Search
CPC ....... G06T 7/0012; G06T 7/90; G06K 9/3233; G06K 9/0014; H04L 67/42
See application file for complete search history.

(56) References Cited

U.S. PATENT DOCUMENTS

| | | | |
|---|---|---|---|
| 5,003,979 A | 4/1991 | Merickel | |
| 5,099,521 A | 3/1992 | Kosaka | |

(Continued)

FOREIGN PATENT DOCUMENTS

| | | | |
|---|---|---|---|
| CN | 101149327 A | 3/2008 | |
| CN | 103020585 A | 4/2013 | |

(Continued)

OTHER PUBLICATIONS

Fluck, Oliver et al "GPU Histogram Computation", 2008.
(Continued)

*Primary Examiner* — John W Lee
(74) *Attorney, Agent, or Firm* — Sherry Austin

(57) ABSTRACT

A client and server are provided with the same digital image of a slice of a biological material, which has been applied with a staining substance. The server is used for pre-processing the digital image and provides results of the pre-processing to the client in turn of a request. The server is configured to classify each pixel of the digital image, wherein the pixel is classified as stained, The client is configured to determine the region of interest at the digital image, and request data related to the classification of the pixels at the region of interest at the server. The server can provide the classification results related to the classification of the pixels at the region of interest at the digital image to the client.

20 Claims, 6 Drawing Sheets

(51) Int. Cl.
  *G06V 10/25* (2022.01)
  *G06V 20/69* (2022.01)
  *H04L 67/01* (2022.01)

(56) References Cited

U.S. PATENT DOCUMENTS

| | | | |
|---|---|---|---|
| 9,247,802 B2 | 2/2016 | Edgar | |
| 9,547,801 B2 | 1/2017 | Marcelpoil | |
| 9,710,694 B2 | 7/2017 | Soenksen | |
| 2006/0072804 A1* | 4/2006 | Watson | G16H 40/67 |
| | | | 382/133 |
| 2006/0115146 A1* | 6/2006 | Ogura | G06K 9/6228 |
| | | | 382/128 |
| 2007/0127814 A1 | 6/2007 | Fluck | |
| 2008/0112614 A1 | 5/2008 | Fluck | |
| 2010/0077358 A1 | 3/2010 | Sugaya | |
| 2010/0183216 A1 | 7/2010 | Yamada | |
| 2011/0060560 A1 | 3/2011 | Longoni | |
| 2012/0314930 A1 | 12/2012 | Hoyt | |
| 2013/0034304 A1 | 2/2013 | Cosatto | |
| 2013/0243292 A1 | 9/2013 | Khurd | |
| 2014/0169654 A1 | 6/2014 | Athelogou | |
| 2014/0314300 A1* | 10/2014 | Kaufman | G06V 20/698 |
| | | | 382/133 |
| 2016/0098590 A1* | 4/2016 | Bredno | G06T 7/0014 |
| | | | 382/133 |
| 2017/0270666 A1* | 9/2017 | Barnes | G06T 7/12 |
| 2017/0337695 A1* | 11/2017 | Sarkar | G06T 7/90 |
| 2017/0372117 A1* | 12/2017 | Bredno | G06V 20/695 |

FOREIGN PATENT DOCUMENTS

| | | |
|---|---|---|
| JP | 2014089499 A | 5/2014 |
| WO | 2007148284 A2 | 12/2007 |
| WO | 2011158162 A1 | 12/2011 |

OTHER PUBLICATIONS

Choudhury, Kingshuk R. et al "A Robust Automated Measure of Average Antibody Staining in Immunohistochemistry Images", Journal of Histochemistry and Cytochemistry, vol. 58, No. 2, 2010, pp. 95-107.
Cyttron-II Project: http://cyttron.org/. 2015.
http://en.wikipedia.org/wiki/Quadtree 2018.
http://en.wikipedia.org/wiki/Summed_area_table 2018.
http://en.wikipedia.org/wiki/Hue 2018.

* cited by examiner

SERVER-CLIENT ARCHITECTURE IN DIGITAL PATHOLOGY

CROSS-REFERENCE TO PRIOR APPLICATIONS

This application is the U.S. National Phase application under 35 U.S.C. § 371 of International Application No. PCT/EP2016/069255, filed on Aug. 12, 2016, which claims the benefit of European Patent Application No. 15182141.0, filed on Aug. 24, 2015. These applications are hereby incorporated by reference herein.

FIELD OF THE INVENTION

The invention relates to a server-client architecture, in particular to the server and the client as such, and a method for handling and processing of digital pathology data.

BACKGROUND OF THE INVENTION

A pathologist has a central role in the diagnostic part of a care cycle. When a biologic material sample is taken from a patient during biopsy, it is usually a pathologist who makes the final diagnosis as to the nature and the gravity of a potential disease by microscopic inspection of the tissue and cells from the biopsy.

In an example, a slide for the microscopic inspection can be prepared in several steps as follows. First, the biological material sample can be placed in formalin for fixation and subsequently processed into a paraffin block, from which thin, about 5 µm, slices are cut. One of these slices is then placed on a substrate of the slide, in particular on a glass substrate, after which one or more stained substances may be applied, such that relevant cell or tissue parts are visible with the microscope. Thereafter, a match fluid and/or a fixative may be added to the slice. Further, a thin, about 170 µm, transparent cover slip can be placed on top of the slice, such that the slice is sealed. This enables a long-term storage, in particular more than 10 years, of the slide including the slice.

Although pathology is typically an analog profession, there has been recently a move towards digital pathology, in order to improve the diagnostic efficiency and quality. Digital pathology refers to a digitalization of the information needed, for analyzing a biological material, in particular a slice, in the field of biology, histology and/or pathology. In particular, digital pathology refers to a digital molecular diagnostic of slices, which have been previously cut from a biological material sample. An exemplary adaptation of the digital pathology would result in the pathologist handling the slices no longer himself physically, but instead to work with the digital images, which can be taken from the slides and other clinical information for making his or her diagnosis.

Document US 2008/0112614 A1 relates to a method for identifying a region of interest within a digital image. The method includes receiving the digital image. The image is divided into a plurality of tiles. It is determined, which of the plurality of tiles includes the region of interest. A graphics processing unit calculates a pixel intensity histogram for the tiles that have been determined to include the region of interest. Not calculated is a pixel intensity histogram for the tiles that do not include the region of interest. Image processing results may then be displayed or printed. A medical practitioner, for example a radiologist, may then examine the processing results.

For the calculation of intensity histograms, a high performance CPU may be needed. Limiting the calculation effort for calculating the histograms to the tiles, that have been determined to include the region of interest, may reduce the calculation effort. However, from a practical point of view, a medical practitioner still needs to wait until the CPU has finished the calculation, before the results can be displayed.

SUMMARY OF THE INVENTION

There may be a need to facilitate the responsiveness of data related to a region of interest of a digital image of a slice of biological material.

The object of the invention is solved by the subject-matter of the independent claims, wherein further embodiments are incorporated in the dependent claims.

According to a first aspect of the invention, a server is provided, comprising a server input interface, a server processing unit, a server storage unit and a server output interface. The server input interface is configured to receive a digital image of a slice of biological material. The slice of a biological material has been applied with at least one staining substance. The server processing unit is configured to classify each pixel of the digital image, wherein a pixel is classified with respect to each staining substance as stained, in case a color-property of the pixel is within a predefined property-range indicative for an absorption of the respective staining substance. The server storage unit is configured to store the digital image and the classification of the pixels of the digital image. The server input interface is configured to receive a request indicating a region of interest of the digital image from the client. The server output interface is configured to provide the stored classification and/or other data related to the classification of the pixels at the region of interest to the client.

As a result, the classification can be carried out and/or finished previously to the request. In case the request occurs, relevant data, in particular the classification stored, may be provided efficiently without the need to compute these at the time of the request or thereafter. Since each pixel of the digital image is classified, the availability of the data related to any region of interest of the digital image is fulfilled. Accordingly, independent of a choice of the region of interest of the digital image, relevant data related to the classification of the pixels, in particular at the region of interest, may be provided in return of the request. Due to this high availability of data related to the classification of the pixels at the region of interest, the server comprises a high responsiveness. A client, which may have requested for the relevant data, may be provided instantly with the requested data, such that the performance at the client site may be increased.

In an example, the server may relate to a computer or a computer system.

In an example, the term "slice" relates to a cut from a biological sample material in form of a thin, in particular about 3 to 10 µm, slice.

In an example, the term "staining substance" relates to a substance enabled to enhance a contrast and/or highlight structures in biological material, in particular of a slice of the biological material.

In an example, the term "staining substance" may also relate to a fluorescent substance, also called as fluorescent staining substance, enabled to fluorescently label structures and/or molecules in biological material, in particular of a slice of the biological material.

In an example, Hematoxylin (H), Eosin (E) or a combination of Hematoxylin and Eosin (H&E) may be employed as a staining substance for staining a slice.

In an example, a biological fluorescent stain, an immunofluorescence and/or a fluorescent protein may be employed as a staining substance for staining a slice.

In an example, staining a slice allows to distinguish for instance between cells, tissue and interconnections, in particular between muscle fibers, connective tissue, blood cells and/or organelles within individual cells.

In an example, the slice of a biological material can be applied with more than one staining substance. For instance, the slice may be applied with a first staining substance and a second staining substance. The first staining substance can be called the staining substance and the second staining substance can be called the counter-staining substance.

In an example, the digital image of the slice comprises a plurality of pixels. For instance, a digital image may comprise more than 100,000 pixels.

In an example, staining a slice may change its color property, which accordingly has influence on the color property of the digital image. It should be understood that the color property may also relate to a fluorescence property. Therefore, a color-property of each pixel of the digital image may be used, to classify, whether the respective pixel shows a small area of the slice, which has been applied with the at least one staining substance. In an example, the classification of a pixel of the digital image relates to a determination whether a color-property of the pixel is of a staining substance specific property-range. The property-range can be predefined, in particular for each of the at least one staining substance. Accordingly, for each staining substance, a specific predefined property-range can be provided.

In an example, the hue of a pixel forms a color-property of the respective pixel.

In an example, the property-range may be formed by a color-band.

In an example, an absorption of a staining substance may relate to a binding of at least a part of a staining substance to structures and/or molecules of a biological material. For instance, a fluorescence staining substance as the staining substance may bind particular molecules of the biological material. Hematoxylin as another example for the staining substance may bind particular salts with acidic of the biological material.

In an example, a slice of biological material at least partly absorbs the applied staining substance. In turn of the absorption of the staining substance, the hue of the slice may change, where the absorption has taken place. Moreover, the degree of the hue-change may depend on the degree of the absorption of the staining substance. Accordingly, a color-band may be indicative for an absorption of a specific staining substance. Thus, different staining substances may relate to different color-bands.

In an example, classifying each pixel of the digital image, wherein a pixel is classified with respect to each staining substance as stained, results in the classification of the pixels of the digital image. The "classification" of the pixels of the digital image may refer to as the classification result.

In an example, the server input interface receives a request indicating a region of interest of the digital image from a client.

In an example, a client relates to a computer, a computer system and/or a software unit. A client may be configured to access a server via a computer network.

In an example, the region of interest (ROI) relates to a region of the digital image, which may show a corresponding region of the slice, which may be for instance according to a user of the client, preferably a pathologist, the relevant part of the slice over which a further analysis or calculation should be carried out. This calculation may comprise a calculation of a score to characterize a staining of the region of interest.

In an example, the request may indicate an arbitrary region of interest of the digital image. Since each pixel has been classified, and the classification result has been stored, the server can be configured to provide a classification result related to the region of interest to the client instantly. The classification result related to the region of interest may be the data related to the classification of the pixels at the region of interest.

In an example, the term "data related to the classification of the pixels at the region of interest" relates to data, which has been calculated—directly or indirectly—on the basis of the results of the classification of the pixels at the region of interest. Preferably, the calculation has been performed prior the request of the client. In this case, the data is pre-calculated and/or pre-processed.

In an example, the term "data related to the classification of the pixels at the region of interest" may also be referred to as "data related to the region of interest"

As a result, pre-processed data regarding the region of interest may be provided for further purposes with high responsiveness from the server to the client. A pathologist at the client site may manually indicate the region of interest on a copy of the digital image. The availability of the classification result according to a certain staining at the server site and the configuration of the server to be able to provide data related to the classification of the pixels at the region of interest, in particular the classification of the pixels at the region of interest, instantly to the client, reduces the processing time at the client for further calculation, in particular for calculating a score. Accordingly, the client can provide a higher performance to the user of the client.

According to an exemplary embodiment of the invention, the server output interface is configured to provide at least a part of the data stored by the server storage unit as the data related to the classification of the pixels at the region of interest to the client.

In an example, the classification stored by the server storage unit is provided as the data related to the classification of the pixels at the region of interest. As a result, the pre-calculated classification or other data stored, each having a direct or indirect relation to the classification of the pixels at the region of interest, may be provided to the client instantly after the request. The client does not necessarily need the processing power for such a calculation, for instance to calculate the classification of each pixel of the digital image. Thus, the performance provided by the client to the user of the client can be increased.

According to an exemplary embodiment of the invention, the server processing unit is configured to calculate at each pixel of the digital image for each staining substance an absorption value on the basis of the color-property of the respective pixel.

According to an exemplary embodiment of the invention, the server processing unit is configured to determine a plurality of digital tiles, each associated with pixels at a sub-area of a total area of the digital image, such that each pixel of a majority of the pixels of the digital image is associated by at least two tiles. The server processing unit is configured to quantize the at least one absorption value of each pixel of the digital image into one of a predefined number of absorption levels. The server processing unit is configured to calculate for each tile an absorption frequency vector for each staining substance, wherein the absorption frequency vectors comprise for each absorption level an entry indicating for the respective staining substance the number of stained pixels of the tile at the respective absorption level. The server storage unit is configured to store the digital tiles and/or the absorption frequency vectors.

In an example, each tile corresponds to a digital sub-image of the digital image.

In an example, adjacent tiles may overlap, in which case they are associated with a common set of pixels of the digital image.

In an example, the absorption values are quantized to form values in correspondence with the absorption levels. The number of absorption levels is limited, such that the processing effort can be reduced for the further steps to be carried out by the server processing unit.

In an example, more than one staining substance has been applied to the slice of biological material. Accordingly, a digital tile associated with a sub-area of the digital image of the slice may comprise pixels classified as stained by a first staining substance and also pixels classified as stained with a second staining substance, etc. Accordingly, for each tile an absorption frequency vector can be calculated for each staining substance.

In an example, each absorption frequency vector relates to one of the staining substances. Each entry of the absorption frequency vector may relate to the number of staining substance specific stained pixels at a corresponding absorption level. For each tile, more than one absorption frequency vector can be provided, in particular as many absorption frequency vectors as staining substances may have been applied to the slice of biological material. The number of entries of the frequency vectors preferably corresponds to the number of absorption levels.

In an example, an entry of a frequency vector relates to the number of pixels classified with the associated staining substance at the tile, which the respective frequency vector relates to.

As a result, an absorption frequency vector provides a distribution frequency of a respective staining substance specific to classified pixels at different absorption levels. Thus, an absorption frequency vector comprises a compact representation about the distribution of the staining substance at a sub-area of the digital image corresponding to the tile, which the absorption frequency vector relates to.

In an example, the server processing unit may be configured to calculate the absorption frequency vectors previously to the request of data related to a specific region of interest. Thus, the calculation of the absorption frequency vectors can be finished, before a client may send a request for data related to a classification of the pixels at the region of interest. Thus, in case the request occurs, relevant data related to the classification of the pixels at the region of interest can be provided initially.

In an example, data related to the classification of the pixels at the region of interest may relate to the absorption frequency vectors, in particular to a sub-set of the absorption frequency vectors. Thus, the absorption frequency vectors, in particular a sub-set thereof, can be provided to the client initially, in return of the request. This initial return increases the performance provided to a user at the client site.

According to an exemplary embodiment of the invention, the server processing unit is configured to determine the plurality of tiles in a quadtree structure and/or an integral image structure.

In an example, tiles at different quadtree structure-levels may have different size and/or are associated with different sizes of sub-areas of the digital image.

In an example, tiles of different quadtree structure-levels may overlap. Accordingly, redundant information may be provided by the tiles at the different quadtree structure-levels.

According to an exemplary embodiment of the invention, the server processing unit is configured to determine upon the request a minimum number of tiles of the plurality of stored digital tiles as selected tiles, such that the selected tiles forming form an integral area corresponding to the region of interest of the digital image. The server input interface is configured to receive for each staining substance an absorption threshold value for the region of interest. The server processing unit is configured to select upon the request the entries of the stored absorption frequency vectors of the selected tiles as selected entries, which related absorption levels are each larger than their related absorption threshold value. The server processing unit is configured to calculate upon the request a score, characterizing a staining at the region of interest, as a function of the selected entries and/or all entries of the stored absorption frequency vectors of the selected tiles. The server output interface is configured to provide the score as the data related to the classification of the pixels at the region of interest to the client.

In an example, the selected tiles may have different sizes.

In an example, adjacent selected tiles may overlap or border perfectly at each other.

In an example, tiles associated with a central region of the region of interest of the digital image may have a larger size than selected tiles associated with another region at the outer edge of the region of interest of the digital image.

As a result, the central region of the region of interest may be covered with less, but larger tiles.

In an example, the average size of the selected tiles may be as large as possible, in order to provide a minimum number of tiles forming the integral area of the region of interest.

In an example, the absorption threshold value may relate to a value for the absorption level or absorption value of a pixel above which the pixel may be considered for calculating the score, characterizing a staining at the region of interest.

As a result, the absorption threshold value may be chosen suitably to neglect pixels of the region of interest having less influence on the actual staining character and/or a respective score.

In an example, the selected entries of a frequency vector relate to the absorption levels of the pixels of the region of interest being larger than or equal to the related absorption threshold value. The relation may refer to the staining substance, to which the absorption frequency vector is associated with.

In an example, for each staining substance, a score can be calculated for the region of interest.

In an example, for a combination of all staining substances, a score can be calculated for the region of interest.

In an example, a score characterizes a staining of a region of interest with a staining substance. Accordingly, for the region of interest, more than one score, in particular as many scores as number of staining substances applied to the slice, may be provided.

In an example, the server output interface is configured to provide the at least one score as the data related to the classification of the pixels at the region of interest to the client.

As a result, the server processing unit may be employed to identify the relevant entries of the absorption frequency vectors, wherein the processing unit may be further configured to compute a score as a function of the identified entries of the absorption frequency vectors, such that the score may be provided to the client.

In an example, the server processing unit may be configured to calculate the absorption frequency vectors prior to the request for data related to a classification of the pixels at the region of interest.

In a further example, the server processing unit may be configured to calculate upon the request, and thus preferably after the request has been received by the server, the at least one score.

As a result, the server processing unit may be configured to calculate the last processing step in turn of the request according to an individual region of interest with a related absorption level provided to the server.

As a result, the server may have pre-processed most of the steps previously to the receipt of the request. As the server may have large processing power, the at least one score may be calculated and thereafter provided to the client within a very limited time. As a result, the server has a high responsiveness.

According to a second aspect of the invention, a client is provided, that comprises a client input interface, a user interface and a client output interface. The client input interface is configured to receive a digital image of a slice of biological material, which has been applied with at least one staining substance. The user interface is configured to display the digital image. The user interface is configured to receive a selection signal from a user and to select a region of interest of the digital image on the basis of the selection signal. The client output interface is configured to send a request for data related to a classification of the pixels at the region of interest to a server. The client input interface is configured to receive upon the request the data related to the classification of the pixels at the region of interest from the server.

In an example, the client relates to a computer unit or a software unit. The client may have access to the server via a computer network.

In an example, the digital image received by the client corresponds to the digital image received by the server. Accordingly, the images may relate to the same digital image.

In an example, the user interface may comprise a display. In particular, the user interface may comprise a touchscreen.

In an example, the user interface may comprise a graphical user interface.

In an example, the user interface is configured to receive a signal from a keypad, a mouse and/or any other computer peripheral that allows a user to enter a user input.

As a result, a user can use the client to send a request for data related to a classification of the pixels at the region of interest to the server, which preferably has pre-calculated data related to the classification of the pixels at the region of interest and may be configured to send this data to the client initially in return. Thus, a client input interface may receive the data related to the classification of the pixels at the region of interest with a short delay after sending the request. Accordingly, the client can provide a high performance and/or responsiveness.

According to a third aspect of the invention, a system is provided, comprising a server according to the first aspect of the invention, and at least one client according to the second aspect of the invention.

According to a fourth aspect of the invention, a method is provided, comprising the following steps:

a) Receiving at a server a digital image of a slice of a biological material, which has been applied with at least one staining substance.

b) Classifying at the server each pixel of the digital image, wherein a pixel is classified with respect to each staining substance as stained, in case a color-property of the pixel is within a predefined property-range indicative for an absorption of the respective staining substance.

c) Receiving at a client the same digital image of the slice of a biological material.

d) Displaying the digital image received at the client by a user interface of the client.

e) Selecting a region of interest of the digital image at the client upon receiving and on the basis of a selection signal provided by a user via the user interface.

f) Sending a request for data related to the classification of the pixels at the region of interest from the client to the server.

g) Sending the classification and/or other data related to the classification of the pixels at the region of interest of the digital image from the server to the client, in case the classifying of step b) has been finished before receiving the request for data related to the classification of the pixels at the region of interest from the client.

In an example, a computer program element for controlling a system according to the third aspect of the invention is provided, which, when being executed by the server processing unit and the at least one client unit, is adapted to perform the method according to the fourth aspect of the invention.

In an example, a computer-readable medium having stored the program element is provided.

According to an aspect of the invention, a client-server-system is provided. The client and the server are provided with the same digital image of a slice of a biological material, which has been applied with a staining substance. Usually, the server comprises a large processing power. Accordingly, the server is used for pre-processing the digital image and provides results of the pre-processing to the client in turn of a request. The server comprises a server processing unit, which is configured to classify each pixel of the digital image, wherein the pixel is classified as stained, in case a color-property of the pixel characterizes a spot corresponding to the pixel at the slice as being stained with the staining substance, whereas the slice has absorbed the staining substance at the respective spot. Thus, all pixels of the digital image are classified. A sub-set of all pixels is classified as being stained. The remaining pixels may be classified as undefined, unstained or stained with a different substance. The server processing unit can be configured to classify the remaining pixels respectively.

Further, the server comprises a server storage unit, to store the digital image and the results of the classification of the pixels. The classification results are called the "classification of the pixels". In case a user at the client site wants to know, whether a region of interest at the digital image comprises pixels, which have been classified as stained, the client is configured to receive a selection signal of the user via an user interface. A client processing unit of the client is configured to determine the region of interest at the digital image. Thus, the client is configured to request data related to the classification of the pixels at the region of interest at the server. The server has pre-processed the classification of the digital image and/or further data based thereon and is thus initially prepared to provide the data related to the classification of the pixels at the region of interest to the client. Accordingly, the server can provide the classification results as the data related to the classification of the pixels at the region of interest at the digital image to the client. The client can display the received classification results, preferably with a display of a user interface. Consequently, the user can see within a short time delay, whether pixels at the region of interest of the digital image are classified as stained.

Further, the server can be configured to determine on the basis of the classification and an absorption threshold value, whether pixels classified as stained at the region of interest contribute to a score, which characterize the staining of the region of interest of the digital image. The client can be configured to receive a signal from the user in order to adapt the absorption threshold value and to send it to the server, whereas at the server the score can be updated accordingly. The score calculated at the server can be taken as the data related to the classification of the pixels at the region of interest and provided to the client. Thus, the client user interface may display the score.

Moreover, the server processing unit may calculate absorption frequency vectors, which each relate to a tile. A plurality of tiles and accordingly a plurality of absorption frequency vectors are provided. Each of the plurality of tiles is associated with a sub-image of the digital image. Furthermore, the tiles are overlapping each other. In particular, the tiles relate to a quadtree structure. Therefore, the tiles are categorized in different levels, whereas tiles of different levels are overlapping each other. The tiles at the same level are adjacent to each other. Accordingly, tiles of different level comprise redundant information about the digital image. Each tile comprises a plurality of pixels.

A sub-set of these pixels may be classified as stained. Depending on the color-property of the stained pixels, a quantization of the stained pixels may be determined, in order to calculate entries for the absorption frequency vectors in correspondence with the number of the stained pixels at the respective absorption levels and a related tile. The absorption levels are limited to the number of entries of the vectors. The absorption frequency vectors are pre-processed at the server processing unit and stored at the server storage unit. In case a request from the client occurs at the server for data related to a region of interest, the server processing unit can select a group of a minimum number of tiles from the different levels. Accordingly, in the center of the region of interest, larger tiles are selected whereas at the borders of the region of interest, smaller tiles are selected. The selected tiles form an integral image corresponding to the region of interest. Since the absorption frequency vectors for the selected tiles have been pre-processed, the relevant information relating to the region of interest can be provided by the respective absorption frequency vectors to the client. The client can select the entries of the absorption frequency vectors of the tiles on the basis of the absorption threshold value. For instance, just the half of the entries of each absorption frequency vector may be taken to calculate at the client a score for the region of interest, whereas the score characterizes the staining of the pixels having an absorption value larger than the absorption threshold value. This gives the user the ability, to update the absorption threshold value at the client site, while the client processing unit in turn may calculate the score on the basis of the predetermined absorption frequency vectors and the (updated) absorption threshold value. Thus, a higher performance can be provided to the client, since the absorption frequency vectors, as the basis for the calculation of the score, have been processed for a plurality of different sets of absorption levels.

These and other aspects of the invention will be apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF EMBODIMENTS

Figure 1:
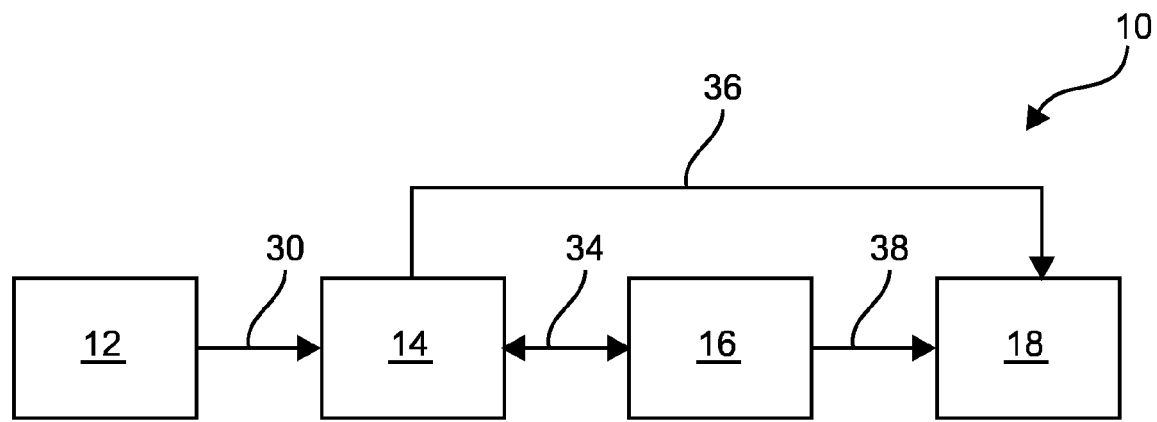
FIG. 1 shows a server in a block diagram.

Unless specified otherwise, identical or similar reference numerals appearing in different figures label identical or similar components.

FIG. 1 schematically shows a first example of the server 10 according to an embodiment of the present invention. The server 10 comprises: A server input interface 12, a server processing unit 14, a server storage unit 16 and a server output interface 18.

The server input interface 12 is configured to receive a digital image 20 of a slice of a biological material, which has been applied with at least one staining substance.

The server processing unit 14 is configured to classify each pixel 24 of the digital image 20, wherein a pixel 26 is classified with respect to a staining substance as stained, in case a color-property of the pixel 26 is within a predefined property-range indicative for an absorption of the respective staining substance.

The server storage unit 16 is configured to store the digital image 20 and the classification of the pixels 24 of the digital image 20.

The server input interface 12 is further configured to receive a request indicating a region of interest 28 of the digital image 20 from a client 22.

The server output interface 18 is configured to provide the stored classification and/or other data related to the classification of the pixels at the region of interest 28 to the client 22.

As a result, the classification of the pixels 24 of the digital image 20 can be carried out previously to the request from the client 22. Accordingly, the server 10 may perform the classification prior to the request from the client 22 and thereafter stores the classification of the pixels 24 of the digital image 20. In case the server input interface 12 receives the request indicating a region of interest 28 of the digital image 20 from the client 22, the server 10 may provide the stored classification of the pixels 24 at the region of interest 28 and/or other data related to the classification of the pixels at the region of interest 28 to the client 22. Thus, the classification and/or other data related to the classification of the pixels at the region of interest 28 may be provided instantly to the client 22. This increases the performance at the client-site. Further, the client 22 does not necessarily need a processing power to be able to classify each pixel of the digital image. Instead, the server processing unit 14 of the server 10 can be configured accordingly.

In an example, the server 10 relates to a device, in particular to a computer or a computer system.

In a further example, the server 10 relates to a fraction of a device.

Figures 2, 3:
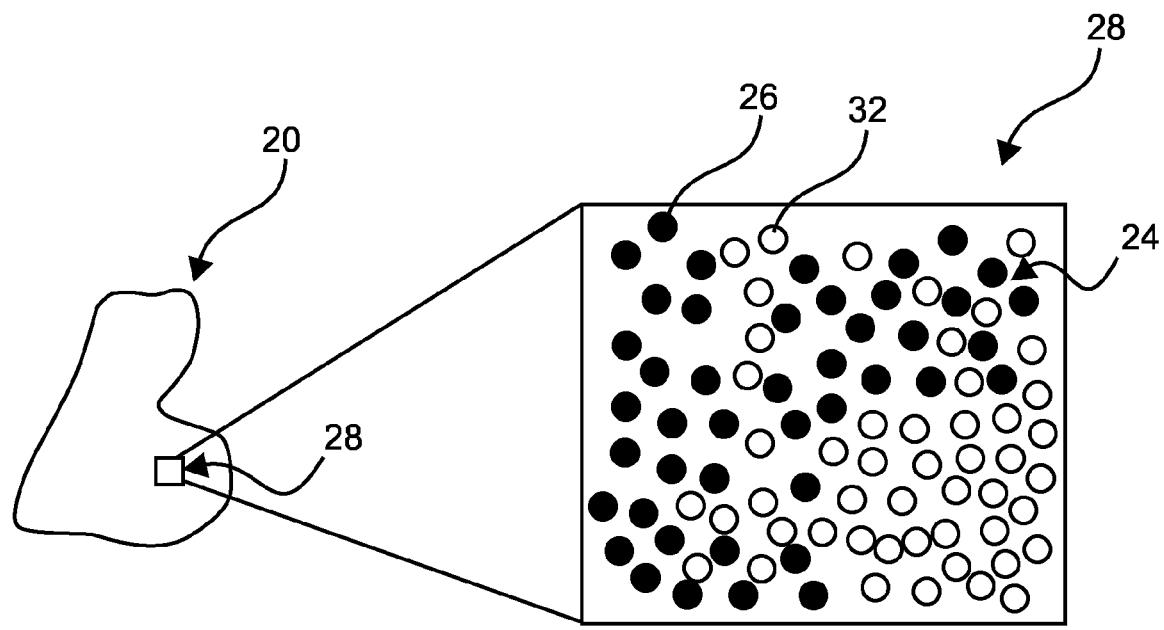
FIG. 2 shows a digital image of a slice.
FIG. 3 schematically shows an example of (counter-) stained pixels at a sub-area of the digital image.

The server input interface 12 is configured to receive the digital image 20. An example of a digital image 20 of the slice of biological material is schematically shown in FIG. 2.

In an example, the digital image 20 is formed by a plurality of pixels 24.

In an example, a first data connection line 30 to connect the server input interface 12 with the server processing unit 14 is provided. Accordingly, the server input interface 12 may provide a digital image 20 via the first data connection to the server processing unit 14.

The server processing unit 14 is configured to classify each pixel 24 of the digital image 20.

At the digital image 20 as shown in FIG. 2, a region of interest 28 of the digital image 20 is exemplarily marked.

In an example, the region of interest 28 relates to a region of the digital image 20, which relates to a corresponding region of the slice, which according for example to a pathologist is a relevant part of the slice over which an analysis should be carried out, in particular where a score should be calculated for.

The region of interest 28 may have been manually indicated by a user at the client 22. The information about the region of interest 28 may then have been sent from the client 22 to the server input interface 12 and being transmitted to the server processing unit 14 via the first data connection 30.

The classification of pixels 24 of the digital image 20 is exemplarily described with respect to FIG. 3.

FIG. 3 shows an enlargement of the region of interest 28 of the digital image 20.

The region of interest 28 of FIG. 3 shows a part of the digital image 20 of the slice of biological material, which has been applied previously with two staining substances.

In order to easily distinguish the results of the application of the first staining substance and the results of the application of the second staining substance, pixels 24 of the digital image 20 being classified as stained by the first staining substance shall be called "stained" or "stained pixel". Pixels 32 classified as stained by a second staining substance shall exemplarily be called "counter-stained" or "counter-stained pixel".

FIG. 3 shows exemplarily that a number of the pixels 24 are stained pixels 26 and that a number of the pixels 24 are counter-stained pixels 32. Further pixels are at the background, which are not shown for a better understanding of the different staining.

With respect to the first staining substance, just the stained pixels 26 have a color-property within a predefined property-range indicative for the absorption of the first staining substance. Furthermore, the counter-stained pixels 32 comprise a color-property within a different predefined property-range indicative for the absorption of the second staining substance. Accordingly, the server processing unit 14 is configured to classify the pixels 24 accordingly.

In an example, the first staining substance may be of a first color, for instance brown.

In an example, the second staining substance may be of a different, second color, for instance blue.

In an example, where staining substances with different colors have been applied to the slice of a biological material, pixels can show their position at the slice, where at least one of the staining substances has been absorbed, such that the slice is at the respective positions predominantly of one of the colors of the staining substances, for instance predominantly brown or predominantly blue.

In an example, so-called Preucil polar plot regions can be used to classify the pixels 24 of the digital image 20. A pixel at the position (x, y) at the digital image 20 may be classified as:

$$C_{x,y} = \begin{cases} \text{stained} & \begin{array}{l} \text{if } (r_{x,y} \geq g_{x,y} \text{ and } g_{x,y} \geq b_{x,y}) \text{ or} \\ (r_{x,y} \geq b_{x,y} \text{ and } b_{x,y} > g_{x,y}) \end{array} \\ \text{counter-stained} & \begin{array}{l} \text{if } (b_{x,y} > g_{x,y} \text{ and } g_{x,y} > r_{x,y}) \text{ or} \\ (b_{x,y} > r_{x,y} \text{ and } r_{x,y} \geq g_{x,y}) \end{array} \\ \text{undefined} & \text{otherwise} \end{cases}$$

wherein:

$C_{x,y}$ relates to a classification result of the pixel at the position (x, y), $r_{x,y}$ relates to a red color component of the pixel at the position (x, y), $g_{x,y}$ relates to a green color component of the pixel at the position (x, y), and $b_{x,y}$ relates to a blue color component of the pixel at the position (x, y).

As exemplarily shown for the region of interest 28 in FIG. 3, a first set of pixels 26 are classified as stained and a second set of pixels 32 are classified as counter-stained. Pixels outside the stained pixels 26 and the counter-stained pixels 32 may be classified as "undefined" and/or may be ignored.

Generally, a slice of a biological material can be applied with more than two staining substances or with a plurality of staining substances.

In an example, the slice of a biological material may be applied with one staining substance. In this case, the classification of the pixels 24 may relate to:

$$C_{x,y} = \begin{cases} \text{stained} & \begin{array}{l} \text{if } (r_{x,y} \geq g_{x,y} \text{ and } g_{x,y} \geq b_{x,y}) \text{ or} \\ (r_{x,y} \geq b_{x,y} \text{ and } b_{x,y} > g_{x,y}) \end{array} \\ \text{undefined} & \text{otherwise} \end{cases}$$

In an example, the server processing unit 14 is configured to classify each pixel 24 of the digital image 20 directly after the server input interface 12 received the digital image 20.

As a result, the pixels 24 of the digital image 20 may be classified before a classification result of the pixels 24 is needed.

The server storage unit 16 is configured to store the digital image and the classification of the pixels 24 of the digital image 20.

As a result, the server storage unit 16 can provide the classification of the pixels 24 of the digital image 20 whenever respective data is requested.

Upon the request indicating a region of interest 28 of the digital image 20 from the client, the server output interface 18 is configured to provide the stored classification of the pixels 24 of the region of interest 28 of the digital image 20 to the client 22. Furthermore, or alternatively, the server output interface 18 may be configured to provide other data related to the classification of the pixels at the region of interest 28 of the digital image 20 to the client 22.

As a result, a received request indicating a region of interest 28 of the digital image 20 may be answered immediately, since the requested data have been pre-processed and stored at the server storage unit 14.

In an example, the server processing unit 14 is connected via a second data connection 34 with the server storage unit 16. Accordingly, the server processing unit 14 may send data, for instance a classification of the pixels 24 of the digital image 20 to the server storage unit 16. In a further example, the server processing unit 14 may retrieve data via the second data connection 34 from the server storage unit 16, for instance the classification of the pixels 24 of the digital image 20.

In a further example, a third data connection 36 is provided to connect the server processing unit 14 and the server output interface 18.

In an example, the server processing unit 14 may be configured to provide data retrieved from the server storage unit 16 via the third data connection 36 to the server output interface 18.

In an example, a fourth data connection 38 is provided to allow the server output interface 18 to retrieve data from the server storage unit 16.

In a further example, the third data connection 36 may be configured to transmit control signals from the server processing unit 14 to the server output interface 18. For example, the server output interface 18 may be controlled by the server processing unit 14 to retrieve data via the fourth data connection 38 from the server storage unit 16.

According to a further example, the server output interface 18 is configured to provide at least a part of the data stored by the server storage unit 16 as the data related to the classification of the pixels at the region of interest 28 to the client 22.

In an example, the classification results of the pixels 24 at the region of interest of the digital image 20 may be provided as the data related to the classification of the pixels at the region of interest 28 to the client 22.

As a result, the amount of data provided to the client 22 by the server output interface 18 can be limited, in particular to the most relevant data with respect to the region of interest 28 of the digital image 20.

According to a further example, the server processing unit 14 is configured to calculate at each pixel 24 of the digital image 20 for each staining substance an absorption value $a_{x,y}$ on the basis of the color-property of the respective pixel 24.

In an example, the absorption value for a pixel preferably relates to the amount of a staining substance, which has been absorbed by the slice at the corresponding position of the respective pixel.

In an example, a spot at the slice changes its color with respect to the staining substance, in case the staining substance is absorbed. Accordingly, a color-property of a pixel may be applied for calculating an absorption value for the respective pixel 24 of the digital image 20.

In an example, an absorption value $a_{x,y}$ for a pixel 24 at the position (x, y) at the digital image 20 may be calculated as:

$$a_{x,y} = 255 - (r_{x,y} + g_{x,y} + b_{x,y})/3.$$

As a result, the absorption value $a_{x,y}$ may be calculated for each pixel 24 independent of the respective staining substance. Preferably, the same formula as cited above may be used for example for a first staining substance and a second staining substance.

The above presented formula may be an approximation that may be only valid, if at a given pixel 24 only a stain or a counter-stain is present, and in particular not both at the same time. The above presented formula for calculating the absorption value $a_{x,y}$ may be a very basic approximation. More sophisticated formulas to calculate an absorption value $a_{x,y}$ for a pixel 24 may be provided in the state of the art.

In an example, the server output unit 18 is configured to provide the absorption value $a_{x,y}$ as the data related to the classification of the pixels at the region of interest 28 to the client 22.

According to a further example, the server input interface 12 is configured to receive for each staining substance an absorption threshold value $a_{th}$ for the region of interest 28. The server processing unit 14 is configured to select the pixels of the stained classified pixels 26 at the region of interest 28 having for at least one staining substance an absorption value $a_{x,y}$ larger than the related absorption threshold value $a_{th}$ as stained selected pixels 26a.

The server storage unit 16 is configured to store the stained selected pixels 26a and/or the absorption values $a_{x,y}$ of the stained selected pixels 26a.

Figures 4, 5:
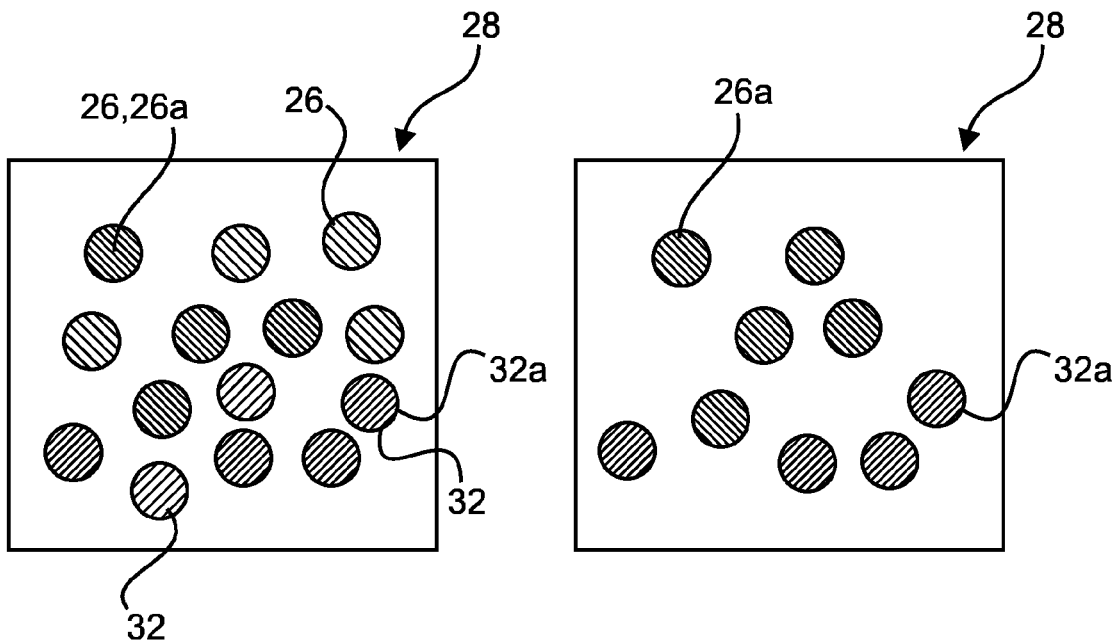
FIG. 4 schematically shows an example of (counter-) stained-classified pixels of another sub-area of the digital image.
FIG. 5 schematically shows the (counter-)stained-classified pixels at the sub-area of FIG. 3 having an absorption level larger than a respective absorption threshold value.

FIG. 4 exemplarily shows a further example of the region of interest 28 of the digital image 20. At the region of interest 28, a plurality of pixels has been classified as stained pixels 26. A further plurality of the pixels at the region of interest 28 has been classified as counter-stained pixels 32.

In an example, the color-property, in particular the hue, of the stained pixels 26 and counter-stained pixel 32, respectively, depend on the amount of absorbed (counter-) staining substance. For example, for the first staining substance, a group of the stained pixels 26 differ in their color intensity. Accordingly, the (counter-)stained pixels 26, 32 are associated with different absorption values, even though they are all classified as (counter-) stained pixels 26, 32.

In a practical application it has been found that a significance about the staining at a region of interest can be increased, if only a sub-set of the stained pixels 26 at the region of interest 28 are considered, which absorption values are larger than a predefined absorption threshold value $a_{th}$. For example, with respect to FIG. 4, preferably just the dark stained pixels 26a are considered for a further purpose. The darkness of the pixels 26, 32 should be indicated by the distance of the lines of the hatching.

The stained selected pixels 26a, which have an absorption value larger than the respective absorption threshold value $a_{th}$ are shown in FIG. 5. Similarly, just the dark counter-stained pixels 32 are shown in FIG. 5.

In an example, just the stained selected pixels 26a, as exemplarily shown in FIG. 5, significantly contribute to a score on the basis of the staining of the slice 20.

In an example, the server output interface 16 is configured to provide the stored (counter-)stained selected pixels 26a, 32a and/or the stored absorption values $a_{x,y}$ of the (counter-)stained selected pixels 26a, 32a as the data related to the classification of the pixels at the region of interest 28 to the client 22.

As a result, the calculation of the (counter-)stained selected pixels 26a, 32a and/or the absorption values $a_{x,y}$ of the (counter-)stained selected pixels 26a, 32a may be carried out upon the request.

According to a further example, the server processing unit 14 is configured to calculate upon the request a score S, characterizing a staining of the region of interest 28, as a function of the stored stained selected pixels 26a and/or the stored absorption values $a_{x,y}$ of the stained selected pixel 26a. The server output interface 18 is configured to provide the score S as the data related to the classification of the pixels at the region of interest 28 to the client 22.

A region of interest 28, as exemplarily shown in FIG. 5, may comprise stained selected pixels 26 referring to a first staining substance and stained selected pixels 32a referring to a second staining substance, further called as the counter-stained selected pixels 32a.

In an example, the score S may be calculated as:

$$S_{area} = \frac{\sum_{a=a_{th}}^{255} N_s[a]}{\sum_{a=a_{th}}^{255} N_s[a] + \sum_{a=a_{th}}^{255} N_c[a]} \times 100[\%]$$

wherein:

$N_S[a]$ relates to the number of the stained selected pixels 26a having an absorption value $a_{x,y}$ at the region of interest 28, $N_C[a]$ relates to the number of counter-stained selected pixels 32a having an absorption value $a_{x,y}$ of a at the region of interest, $$a \equiv 255 - \left(\frac{r+g+b}{3}\right), \text{ and}$$

$r, g, b \in \{0, \ldots, 255\}$.

The above provided score S may be referred to as the area score. A further example for calculating a score may be provided as:

$$S_{intensity} = \frac{\sum_{a=a_{th}}^{255} a \cdot N_s[a]}{\sum_{a=a_{th}}^{255} N_s[a]}$$

The above provided formula for calculating the score S may be called as the intensity score.

For calculating the score S, a combination of the area score and the intensity score may be considered.

In an example, the score S may be a function f of $N_S[a]$ and $N_C[a]$:

$S = f(a, N_S[a], N_C[a])$.

With respect to the FIGS. 2, 4 and 5, the region of interest 28 and the absorption threshold value $a_{th}$ may have been predefined. However, the request may be changed by the client 22 and thus a different region of interest 28 and/or a different absorption threshold value $a_{th}$ may be provided to the server 10 as a new request.

According to an exemplary embodiment of the invention, the server processing unit 14 is configured to determine a plurality of digital tiles 40, each associated with pixels 24 at a sub-area of a total area of the digital image 20, such that each pixel of a majority of the pixels 24 of the digital image 20 is associated by at least two tiles 40. The server processing unit 14 is configured to quantize the at least one absorption value $a_{x,y}$ of each pixel 24 of the digital image 20 into one of a predefined number k of absorption levels $a_p$. The server processing unit 14 is configured to calculate for each tile 40 an absorption frequency vector N for each staining substance. The absorption frequency vectors N comprise for each absorption level $a_p$ an entry indicating for the respective staining substance the number of stained pixels 26 of the tile 40 at the respective absorption level $a_p$. The server storage unit 16 is configured to store the digital tiles 40 and/or the absorption frequency vectors N.

Figures 6, 7, 8:
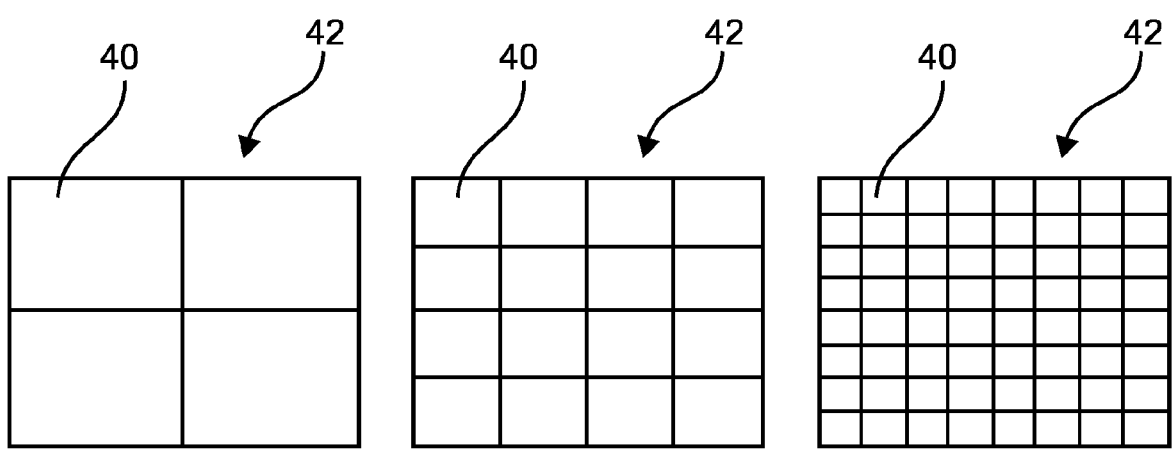
FIG. 6 shows a basic structure of a plurality of tiles at a first level.
FIG. 7 shows a basic structure of a plurality of tiles at a second level.
FIG. 8 shows a basic structure of a plurality of tiles at a third level.

A sample area 42 of the digital image 20 is shown in FIG. 6. The sample area 42 is divided into four tiles 40. Each one of the tiles 40 is associated with pixels at a sub-area of the digital image 20. In other words, each tile 40 may form a sub-image of the digital image 20.

A further example of the sample area 42 is shown in FIG. 7. The sample area 42 shown in FIG. 7 is preferably associated with the same pixels of a sub-area as the sample area 42 shown in FIG. 6. In other words, the sample areas 42 of FIGS. 6 and 7 map to the same sub-area of the digital image 20.

The sub-area 42 shown in FIG. 7 is divided into 16 tiles 40. Each tile 40 of the sub-area 42 of FIG. 7 is associated with pixels of the digital image 20. As can be seen in comparison between FIG. 6 and FIG. 7, the same pixels of the digital image are associated by the tile 40 of the sample area 42 of FIG. 6. Since the tiles 40 of the sub-area 42 of FIG. 6 are larger than the tiles 40 shown in FIG. 7, the tiles 40 of FIG. 6 are associated with even more pixels of the digital image 20.

A further example of a sample area 42 divided into a plurality of tiles 40 is shown in FIG. 8. The sample area 42 of FIG. 8 corresponds to the sample areas 42 of FIG. 6 and FIG. 7. Accordingly, the sample area 42 is associated preferably with the same pixel 24 of the digital image 20 as the sample areas 42 of FIG. 6 and FIG. 7.

As can be seen from FIG. 8, the sample area 42 is divided into 64 tiles 40.

FIG. 6 to FIG. 8 show an example of a quadtree structure for the tiles. FIG. 6 shows an example of a first quadtree level, FIG. 7 shows a second quadtree level and FIG. 8 shows a third quadtree level. For the sample area 42, the number of tiles 40 increases, in particular increases exponentially. However, tiles 40 of the sample areas 42 at the different quadtree levels are associated, at least in part, with the same pixels 24 of the digital image 20.

As a result, each pixel of a majority of pixels 24 of the digital image 20 is associated by at least two tiles 40, in particular where the tiles 40 are structured at different quadtree levels.

As a further result, the tiles 40, in particular at different quadtree levels, are associated with common pixels, which facilitate the further proceeding at the server 10. For the further proceeding, a suitable selection of the tiles 40 may be used to calculate the score S for the region of interest 28.

In an example, the proceeding may be facilitated by the use of integral image techniques. The tiles 40 are preferably of rectangular shape. Thus, a sub-area of the region of interest 28 may be related to a rectangular area being defined by the points A, B, C and D, each being located at a distinct position (x, y). Further, each of the points A, B, C and D relate to a corner point of a tile 40 in the sense of a rectangular integral image tile, and thus each forming an integral image tile, wherein the integral image tiles are properly chosen from the tiles 40 as explained above at any quadtree level.

In an example, the score S of the area being defined by the points A, B, C and D may be calculated as:

$$S = \frac{\sum_{a=a_{th}}^{255} I_s[a]}{\sum_{a=a_{th}}^{255} I_s[a] + \sum_{a=a_{th}}^{255} I_c[a]} \times 100[\%]$$

wherein:

$$\sum_{a=a_{th}}^{255} I_s[a] = \sum_{a=a_{th}}^{255} (I_s[x_D, y_D, a] - I_s[x_B, y_B, a] - I_s[x_C, y_C, a] + I_s[x_A, y_A, a])$$

and $$\sum_{a=a_{th}}^{255} I_c[a] = \sum_{a=a_{th}}^{255} (I_c[x_D, y_D, a] - I_c[x_B, y_B, a] - I_c[x_C, y_C, a] + I_c[x_A, y_A, a])$$

and wherein:

A relates to a position $(x_A, y_A)$;
B relates to a position $(x_B, x_B)$;
C relates to a position $(x_C, y_C)$;
D relates to a position $(x_D, y_D)$;
$I_S[x,y,a]$ relates to the number of the stained selected pixels 26a at an area left and above of the position (x, y) of the digital image 20 having an absorption value a; and
$I_C[x,y,a]$ relates to relates to the number of the counter-stained selected pixels 32a at an area left and above of the position (x, y) of the digital image 20 having an absorption value a;

In order to facilitate the further proceeding at the server 10 even more, a further pre-processing at the server is provided.

The absorption values $a_{x,y}$ of the pixels 24 may vary in their value widely. In order to reduce their processing effort, the absorption values $a_{x,y}$ of each pixel 24 of the digital image 20 may be quantized at the server processing unit 14 into one of a predefined number k of absorption levels $a_p$. Accordingly, a large possible number of absorption values $a_{x,y}$ may be mapped into a small set, in particular defined by the number k, of absorption levels $a_p$.

Each tile 40 is associated with a plurality of pixels 24 of the digital image 20. Thus, there may be a distribution of different absorption levels $a_p$ with respect to the pixels 24 associated by the respective tile 40.

The information about the distribution of the absorption levels $a_p$ of the pixels 24 at a tile 40 may be arranged in the absorption frequency vector N.

For each tile 40, more than one absorption frequency vector N may be provided, in particular one for each staining substance.

In an example, the number of entries of each absorption frequency vector N corresponds to the number k of the absorption levels $a_p$. The entries as such indicate for the respective staining substance the number of stained pixels at the respective tile at the related absorption level $a_p$.

In other words, in an example, for each tile 40, the entries of the related absorption frequency vector N correspond to the number of absorption substance specific stained pixels 24 of the respective tile 40, namely the number of pixels 24 being classified as stained with the respective staining substance, at the different absorption levels ap.

For example, a first entry of an absorption frequency vector N relates to a first absorption level $a_p$. In a further example, a tile 40 may comprise ten pixels associated with the first absorption level $a_p$, such that the first entry of the absorption frequency vector N for this tile 40 may have the value ten. The further entries of the absorption frequency vector N are calculated in an analogous way for the respective tile 40.

In an example, the server processing unit 14 may be configured to pre-calculate for each tile 40 an absorption frequency vector N for each staining substance.

As a result, the calculation of the absorption frequency vectors N can be carried out and/or finished previously to a request from the client 22.

As a further result, in case the request from the client 22 occurs, the server 10 is prepared due to the pre-processing to provide data related to a region of interest 28 initially. This increases the performance for the user at the client site.

In an example, the server output interface 18 is configured to provide the stored digital tiles 40 and/or the stored absorption frequency vectors N as the data related to the classification of the pixels at the region of interest 28.

According to an example of the invention, the server processing unit 14 is configured to determine the plurality of tiles 40 in a quadtree structure and/or an integral image structure.

A quadtree structure for arranging data is generally known in the state of the art.

An integral image structure for arranging data is generally known in the state of the art, too.

In an example, the quadtree structure comprises tiles 40 at at least two levels. With respect to FIGS. 6 to 8, tiles 40 at different quadtree-levels have been exemplarily described. The tiles 40 of the different quadtree-levels may be associated with the same plurality of pixels 24 of the digital image 20.

Figure 10:
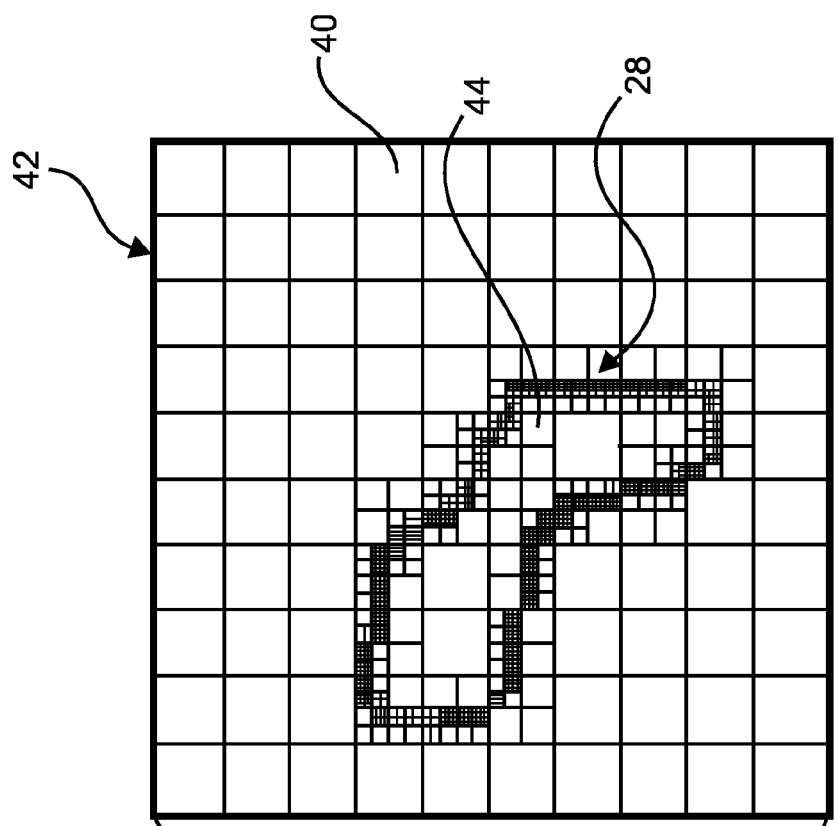
FIG. 10 shows the sample-area of FIG. 9 enlarged and being divided into tiles.
Figure 9:
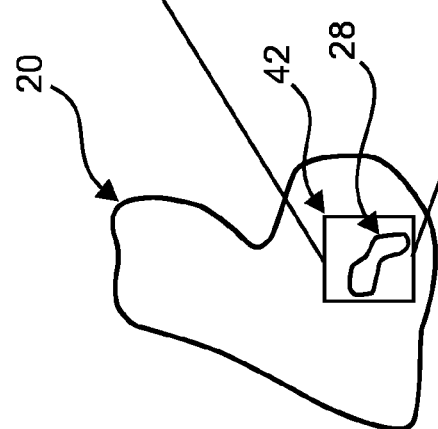
FIG. 9 exemplarily shows a digital image of a slice and a sample-area at the digital image with a region of interest marked.

According to a further example of the invention, as exemplarily shown in FIGS. 9 and 10, the server processing unit 14 is configured to determine upon the request a minimum number of tiles of the plurality of stored digital tiles 40 as selected tiles 44, such that the selected tiles 44 form an integral area corresponding to the region of interest 28 of the digital image 20. The server output interface 18 is configured to provide the selected tiles 44 and/or the absorption frequency vectors N of the selected tiles 44 as the data related to the classification of the pixels at the region of interest 28 to the client 22.

As a result, the amount of data provided to the client 22 may be limited, in particular with respect to the region of interest 28.

As a further result, the selection process does not need to be carried out at the client 22. Instead, the performance of the server processing unit 14 can be utilized for the determination of the selected tiles 44. Thus, a performance increase for the user at the client site can be provided.

In an example, the integral image is a minimum integral area corresponding to the region of interest 28 of the digital image 20.

FIG. 9 exemplarily shows the digital image 20. A sample area 42 is marked at the digital image 20, comprising a sub-area forming the region of interest 28.

FIG. 10 shows the sample area 42 enlarged.

With respect to the explanations regarding FIGS. 6 to 8, the sample area 42 may be divided into tiles 40 with different sizes at different quadtree-levels.

Within the region of interest 28, selected tiles 44 are shown. The selected tiles 44 may comprise different sizes, corresponding to the respective quadtree-level.

In the middle of the region of interest 28, the selected tiles 44 may have a larger size and may relate to a first quadtree-level. In a direction to the border of the region of interest 28, the size of the selected tiles 44 decreases, such that the respective, selected tiles 44 relate to tiles 40 at a higher quadtree-level.

In an example, the selected tiles 44 are selected from different quadtree-levels, such that the selected tiles 44 form the integral area corresponding to the region of interest 28 of the digital image 20.

In an example, the selection of tiles 44 relates also to the corresponding absorption frequency vectors N. Thus, by determining the selected tiles 44, also the respective absorption frequency vectors N may be determined.

In case a request from the client 22 about a region of interest 28 occurs at the server 10, the server output interface 18 may be configured to provide the absorption frequency vectors N of the selected tiles 44 as the data related to the classification of the pixels at the region of interest 28 to the client 22.

As a result, the client 22 may receive a minimum data, since the selected tiles 44 may form a minimum number of tiles forming the integral area corresponding to the region of interest 28. Thus, the absorption frequency vectors N related to the selected tiles 44 may also form a minimum number of absorption frequency vectors N relating to the region of interest 28.

As a result, the client 22 may process for further purposes less data set with respect to the region of interest 28. This increases the performance at the client site.

According to an example of the invention, the server processing unit 14 is configured to determine upon the request a minimum number of tiles of the plurality of stored digital tiles 40 as selected tiles 44, such that the selected tiles 44 form an integral area corresponding to the region of interest 28 of the digital image 20. The server input interface 12 is configured to receive for each staining substance an absorption threshold value $a_{th}$ for the region of interest 28. The server processing unit 14 is configured to select upon the request the entries of the stored absorption frequency vectors N of the selected tiles 44 as selected entries, where related absorption levels $a_p$ are each larger than their related absorption threshold value $a_{th}$.

The server processing unit 14 is configured to calculate upon the request a score S, characterizing a staining at the region of interest 28, as a function of the selected entries and/or all entries of the stored absorption frequency vectors N of the selected tiles 44. The server output interface 18 is configured to provide the score S as the data related to the classification of the pixels at the region of interest 28 to the client 22.

As a result, the server processing unit 14 may be employed to identify the relevant entries of the absorption frequency vectors N related to the classification of the pixels at the region of interest 28, wherein the processing unit 14 may be further configured to compute the score S as a function of the identified entries of the absorption frequency vectors N.

In an example, the determination of the plurality of digital tiles 14 is pre-processed by the server processing unit 14 and the plurality of digital tiles 14 are stored by the server storage unit 16. Accordingly, in case a request for data related to a classification of the pixels at the region of interest 28 is received from the client 22 at the server input interface 12, the server processing unit 14 in turn selects the relevant tiles 44, such that the selected tiles 44 form the integral area corresponding to the region of interest 28 of the digital image 20. Thus, the selection can be performed at the server 10, however with a usually high performance server processing unit 14. Since the plurality of digital tiles 40 is already stored, the selection process can be carried out quickly.

With respect to the absorption threshold value $a_{th}$, reference is made to the explanation to the absorption threshold value $a_{th}$ as explained in previous text passages.

In an example, each stored absorption frequency vector N comprises entries, which relate to the preferred number k of absorption levels $a_p$. However, on the basis of the absorption threshold value $a_{th}$, a selection of the entries of the stored absorption frequency vectors N can be carried out to select the relevant entries, which contribute to an envisaged score S about the staining at the region of interest 28. Accordingly, by adapting the absorption threshold value $a_{th}$, a contribution may be adapted for the entries of the absorption frequency vectors N.

In case, the absorption frequency vectors N are pre-processed by the server processing unit 14 and stored by the server storage unit 16, a selection of entries of the stored absorption frequency vectors N with respect to the absorption threshold value $a_{th}$ may be carried out quickly by the server processing unit 14. Even an adaptation of the absorption threshold value $a_{th}$ may in turn initiate the server processing unit 14 to update the selected entries. This update can be carried out quickly, too.

In an example, as already cited above, the score S may be calculated as:

$$S_{intensity} = \frac{\sum_{a=a_{th}}^{255} a \cdot N_s[a]}{\sum_{a=a_{th}}^{255} N_s[a]}$$

As a result, the server processing unit 14 is configured to calculate the final processing step(s), in case a request for data related to a region of interest 28, in particular accompanied with a related absorption threshold value $a_{th}$, reaches the server input interface 12.

As a further result, the server processing unit 14 may calculate the score quickly, since the data, in particular the frequency distribution vectors N, on which basis the score is calculated are pre-processed and stored.

Figure 11:
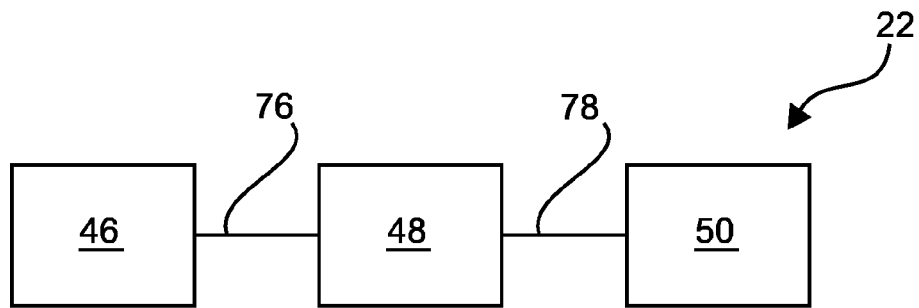
FIG. 11 shows a client in a block diagram.

According to a further aspect of the invention, a client 22 is provided. The client 22 is exemplarily shown in FIG. 11. The client 22 comprises a client input interface 46, a user interface 48 and a client output interface 50. The client input interface 46 is configured to receive a digital image 20 of a slice of a biological material, which has been applied with at least one staining substance. The user interface 48 is configured to display the digital image 20. The user interface 48 is configured to receive a selection signal of a user and to select a region of interest 28 of the digital image 20 on the basis of the selection signal. The client output interface 50 is configured to send a request for data related to a classification of the pixels at the region of interest 28 to a server 10. The client input interface 46 is configured to receive upon the request the data related to the classification of the pixels at the region of interest 28 from the server 10.

In an example, the digital image 20 received by the client 22 corresponds to the digital image 20 received by the server 10. Accordingly, the digital images 20 may relate to the same digital image 20.

In an example, the client input interface 46 may be configured to provide data received from the server 10 via a data connection 76 to the user interface 48 of the client 22.

According to an example of the invention, the user interface 48 of the client 22 is configured to display the received data related to the classification of the pixels at the region of interest 28.

In an example, the user interface 48 may comprise a graphical user interface.

In an example, the user interface 48 may comprise a display. In particular, the user interface may comprise a touch-screen.

In an example, the client input interface 46 is a hardware input interface and/or a software input interface.

In an example, the user interface 48 is configured to receive a signal from a keypad, a mouse and/or any other computer periphery that allows a user to enter a user input.

In an example, the user interface 48 may be configured to provide data and/or requests to the client output interface 50 via a data connection 78.

As a result, a user can use the client 22 to send a request for data related to a region of interest 28 to the server 10, which preferably has pre-calculated data related to the classification of the pixels at the region of interest 28 and may be configured to send this data to the client 22 initially in return. Thus, a client input interface 46 may receive the data related to the classification of the pixels at the region of interest 28 with a short delay after sending the request. Accordingly, the client 22 can provide a high performance and/or responsiveness.

In an example, the client output interface 50 is a hardware output interface and/or a software output interface. In an example, the client input interface 46 and the client output interface 50 are combined as a client interface.

In an example, the client input interface 46 is configured to receive data via a computer network.

In an example, the client output interface 50 is configured to send data via a computer network.

Figure 12:
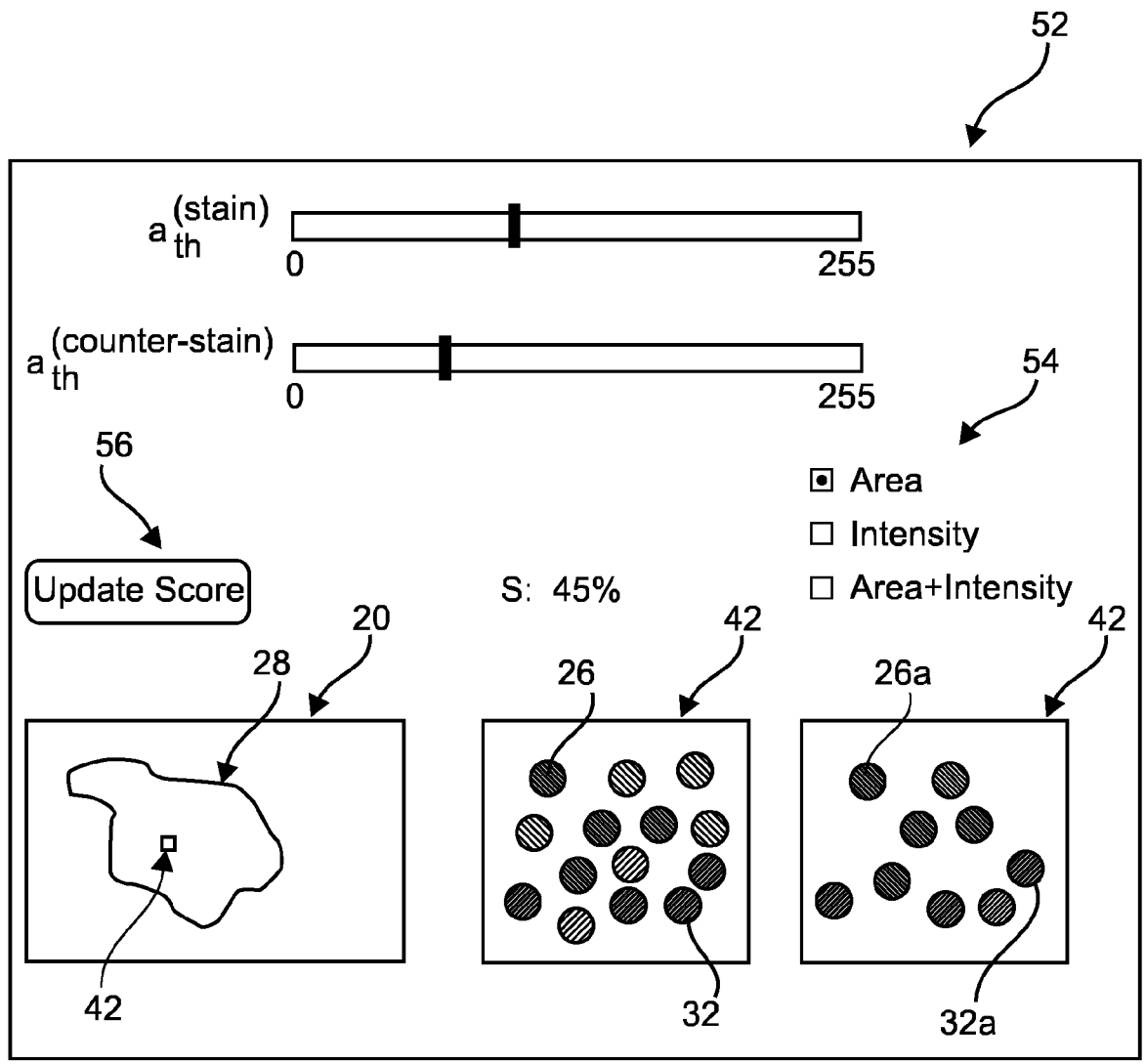
FIG. 12 shows an example of an image display.

FIG. 12 shows exemplarily an image display 52, which can be displayed by the user interface 48, in particular by the display of the user interface 48.

In an example, the image display 52 comprises the digital image 20.

In an example, the region of interest 28 is highlighted at the digital image 20.

In a further example, a sample area 42 at the region of interest 28 may be selected via the user interface 48, and thus by a user.

In an example, the sample area 42 is shown enlarged at the image display 52.

In an example, at the enlarged sample area 42, stained pixels 26 and counter-stained pixels 32 are shown.

Furthermore, a first slider provided at the image display 52 to show and/or adjust the absorption threshold value $a_{th}^{stain}$ for the staining substance (the first staining).

In an example, a further slider is provided at the image display 52 to show and/or adjust the absorption threshold value $a_{th}^{counter\text{-}stain}$ of the counter-staining substance (second staining substance).

With respect to the absorption threshold values $a_{th}^{stain}$, the relevant pixels of the stained pixels 26 can be selected as stained selected pixels 26a.

With respect to the absorption threshold values $a_{th}^{counter\text{-}stain}$, the relevant pixels of the stained pixels 32 can be selected as stained selected pixels 32a.

A respective selection may be shown in a (further) sample area 42 at the image display 52. This sample area 42 may show the stained selected pixels 26a and the counter-stained selected pixels 32a.

In an example, on the basis of the stained selected pixels 26a and the counter-stained selected pixels 32a and their respective absorption values $a_{x,y}$, a score S can be calculated.

In an example, the score S can be shown at the image display 52.

In a further example, the image display 52 shows check boxes 54, to select a formula for calculating the score S.

In a further example, the image display 52 may comprise an update button 56. Selecting the update button 56 may initiate an update-calculation of the score S. This may take adjusted absorption threshold values $a_{th}$ or an adapted selection for the formula to calculate the score into account.

In an example, a score S is provided by the server 10 to the client 22. The client 22 may display the score A via the user interface 48.

In an example, the client input interface 46 is configured to receive a classification of the pixels 24 at the region of interest 28 as at least a part of the data related to the region of interest 28 from the server 10.

In an example, the image display 52 may comprise an area to show the classification of the pixels 24 at the region of interest 28. In particular, the classification may be highlighted at the digital image 20.

In an example, the client 22 comprises a client processing unit 58.

Figure 13:
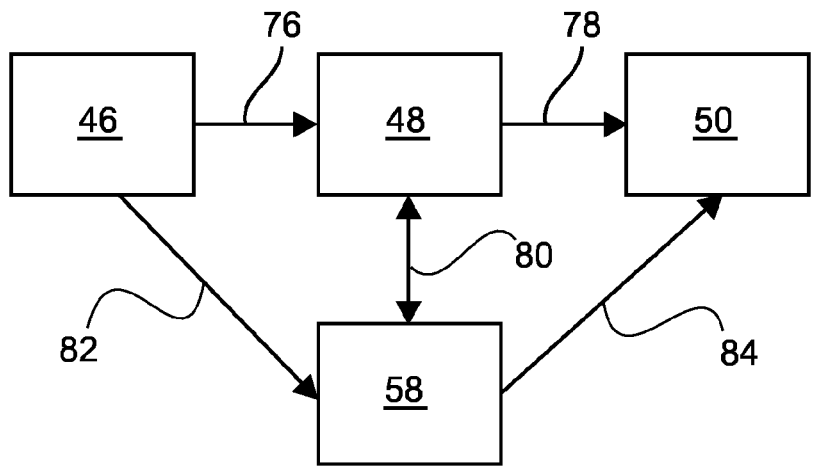
FIG. 13 shows a further example of a client in a block diagram.

In an example, as exemplarily shown in FIG. 13, the client processing unit 58 may be connected to the client input interface 46 via a data connection 82, to the user interface 48 via a data connection 80, and/or to the user output interface 50 via a data connection 84.

As a result, the client 22 may be configured to perform post-processing steps based on the data provided by the server 10 upon the request for data related to the region of interest 28.

According to an example of the invention, the user interface 48 of the client 22 is configured to receive an inspection signal of a user. The client processing unit 58 is configured to determine the sample area 42 at the region of interest 28 on the basis of the inspection signal. The user interface 48 is configured to display the sample area 42 enlarged at a first detail window. The user interface 48 is configured to display the classification results of the pixels of the sample area 42 at a second detail window.

As a result, a user can verify manually, whether the classification shown at the second detail window corresponds to the expected results, in particular for the current setting(s) of the absorption threshold value(s) $a_{th}$, when manually inspecting the sample area 42 at the first detail window.

In an example, the first detail window and the second detail window are of the same size. As a result, the verification is simplified.

According to a further example of the invention, the client input interface 48 is configured to receive for each staining substance an absorption threshold value $a_{th}$ for the region of interest 28. The client output interface 50 is configured to send the at least one absorption threshold value $a_{th}$ with the request for data related to a classification of the pixels at the region of interest 28 to the server 10. The client input interface 46 is configured to receive upon the request from the server 10 absorption values $a_{x,y}$ of stained selected pixels 26a, 32a at the region of interest 28, wherein the stained selected pixels 26a, 32a are classified as stained and having an absorption value $a_{x,y}$ larger than their absorption threshold value $a_{th}$. The client 22 comprises the client processing unit 58. The client processing unit 58 is configured to calculate a score S, characterizing a staining of the region of interest 28, as a function of the absorption values $a_{x,y}$ of the stained selected pixels 26a, 32a. The user interface 48 is configured to display the score S.

As a result, final steps may be carried at the client 22 instead, namely on the basis of server-pre-processed data or previously stored data (at the server 10).

With respect to the previously explained preferred configuration of the client 22, reference is made to the respective configuration of the server 10. Similar features and their explanations may be implemented at the client 22. It should therefore be understood that, without repeating here all the examples in explanation provided with reference to the server 10 of the invention, that the processing steps on the basis of the data stored may be carried out by the client processing unit 58. In particular, the client processing unit 58 may be configured to carry out at least one of these steps.

As a result, a score S can be calculated at the client 22, however, on the basis of the data pre-processed by the server 10. This increases the responsiveness and/or the performance provided to a user by client 22.

According to a further example of the invention, the client input interface 46 is configured to receive for each staining substance an absorption threshold value $a_{th}$ for the region of interest 28. The client output interface 50 is configured to send the at least one absorption threshold value $a_{th}$ with the request for data related to a classification of the pixels at the region of interest 28 to the server 10. The client input interface 46 is configured to receive from the server 10 absorption frequency vectors N of selected digital tiles 44 of the region of interest 28. The selected tiles 44 form an integral area corresponding to the region of interest 28. For each selected tile 44 and each staining substance an associated absorption frequency vector N is provided. Each absorption frequency vector N comprises for absorption level $a_p$ an entry indicating for the respective staining substance the number of stained pixels 26 of the respective tile 44 at the respective absorption level $a_p$. The client 22 comprises the client processing unit 58. The client processing unit 58 is configured to select the entries of the absorption frequency vectors N as selected entries, which associated absorption levels $a_p$ are each larger than related absorption threshold value $a_{th}$. The client processing unit 58 is configured to calculate upon the request a score S, characterizing a staining at the region of interest 28, as a function of the selected entries and/or all entries of the absorption frequency vectors N. The user interface 48 is configured to display the score S.

With respect to the previously explained preferred configuration of the client 22, reference is made to the respective configuration of the server 10. Similar features and their explanations may be implemented at the client 22. It should therefore be understood that, without repeating here all the examples in explanation provided with reference to the server 10 of the invention, that the processing steps on the basis of the data stored may be carried out by the client processing unit 58.

As a result, the score S may be calculated at the client 10, however, on the basis of the data pre-processed by the server 10. This increases the responsiveness and/or the performance provided to a user by the client 22.

As a result, the region of interest 28 and/or the absorption threshold value $a_{th}$ can be varied, while the score S can be re-calculated upon and on the basis of the already received data. An image display 52 can be updated accordingly.

As a result, pre-processed data may be transmitted from the server 10 to the client 22 once, since the transmitted data may be the basis to calculate the score, even with different regions of interest and/or absorption threshold values $a_{th}$.

Figure 14:
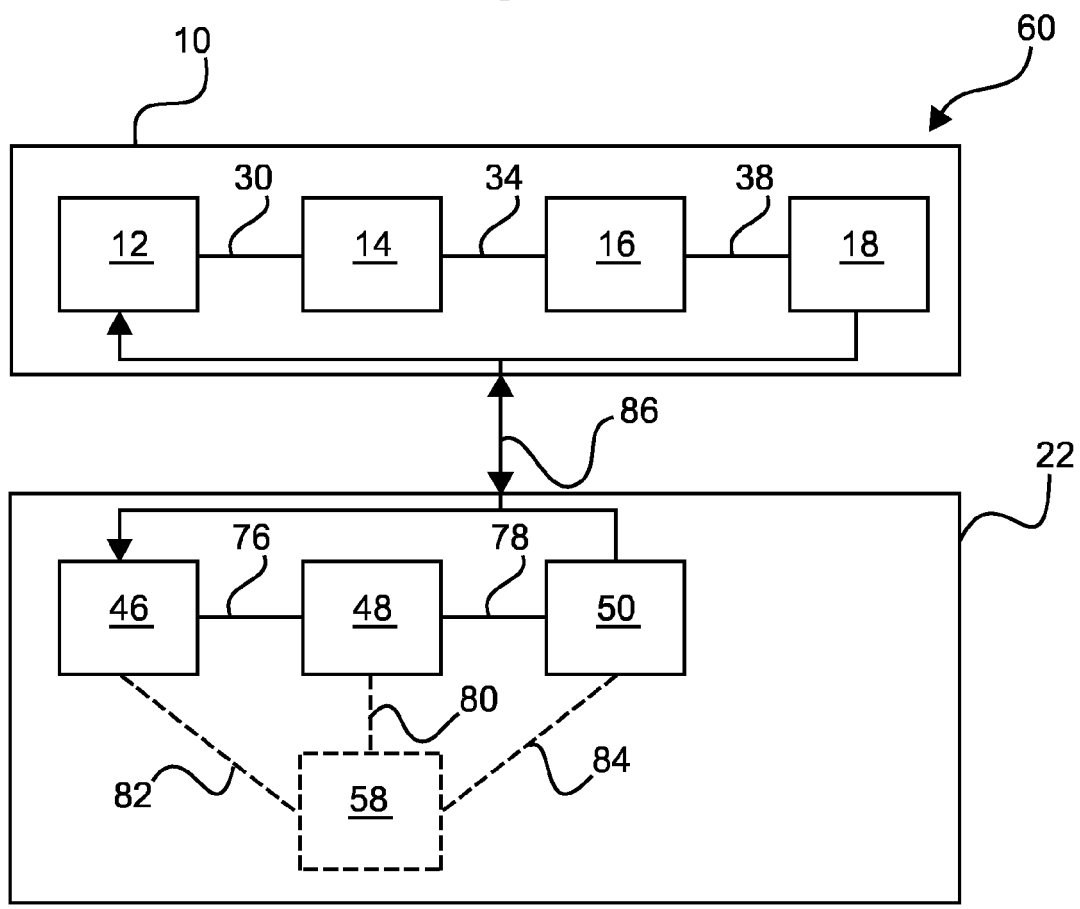
FIG. 14 shows a system in a block diagram.

According to a third aspect of the invention, a system 60 is provided. The system 60 is exemplarily shown in FIG. 14. The system 60 comprises a server 10 according to one of the preceding examples. The system 60 also comprises at least one client 22 according to one of the preceding examples.

It should be understood, without repeating here all the examples and explanation provided with reference to the server 10 and/or the client 22, the system of the invention is intended to being configured accordingly. Thus, the above examples and explanations, although firstly provided with reference to the server 10 and/or client 22, are also intended to being implemented by the system 60. This can be achieved, for example, by means of suitable hardware and/or software.

In an example, a data connection 86 between the server 10 and the at least one client 22 is provided. The data connection 86 may be configured to transmit data and/or requests.

Figure 15:
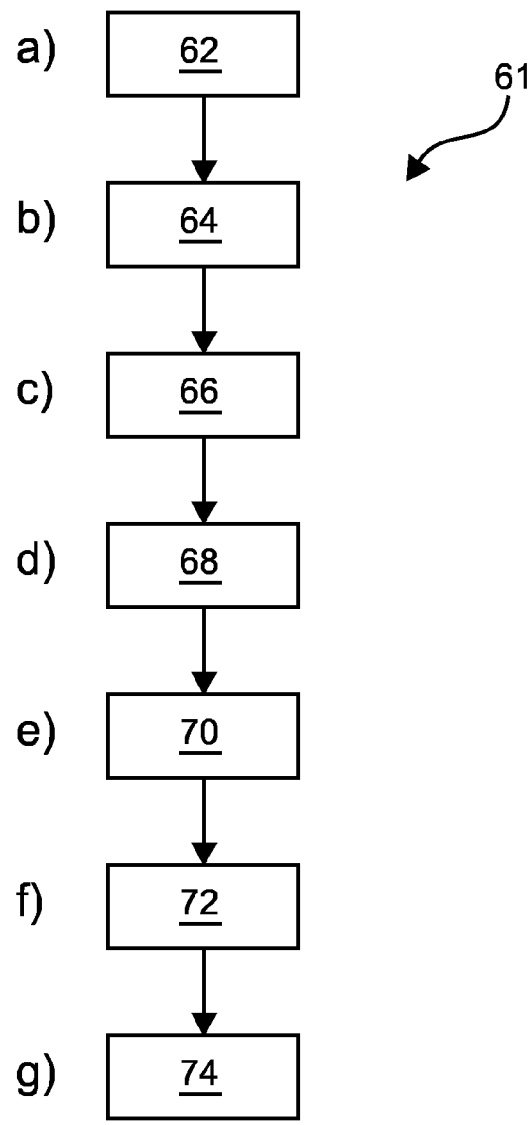
FIG. 15 shows basic steps of a method.

According to a fourth aspect of the invention, a method 61 is provided. The method 61 is exemplarily shown in FIG. 15. The method 61 comprises the following:

In a first receiving step 62, also referred to as step a), a digital image of a slice of a biological material, which has been applied with at least one staining substance, is received at a server 10.

In a second classifying step 64, also referred to as step b), each pixel 24 of the digital image 20 is classified at the server 10, wherein a pixel 24 is classified with respect to each staining substance as stained, in case a color-property of the pixel 24 is within a predefined property-range indicative for an absorption of the respective staining substance.

In a third receiving step 66, also referred to as step c), the same digital image 20 of the slice of a biological material is received at the client 22.

In a fourth displaying step 68, also referred to as step d), the digital image 20 received at the client 22 is displayed by a user interface 48 of the client 22.

In a fifth selecting step 70, also referred to as step e), a region of interest 28 of the digital image 20 is selected at the client 22 upon receiving and on the basis of a selection signal of a user via the user interface 48.

In a sixth sending step 72, also referred to as step f), a request for data related to a classification of the pixels at the region of interest 28 from the client 22 is sent to the server 10.

In a seventh sending step 74, also referred to as step g), the classification and/or other data related to the classification of the pixels at the region of interest 28 of the digital image 20 from the server 10 is sent to the client 22, in case the classifying of step b) has been finished before receiving the request for data related to the classification of the pixels at the region of interest 28 from the client 22.

In an example, a first group of steps a) and b) may be performed before, after, in parallel, overlapping or in any other time order to a second group of steps c) to f).

In an example, the first group of steps are performed in their named order.

In an example, the second group of steps are performed in their named order.

It is to be understood that, without repeating here all the examples and explanations provided with reference to the server 10 and the client 22, the method 61 of the invention is intended to being formed to carry out the method steps of the server 10 and/or the client 22, respectively. Thus, all of the above examples and explanations, although firstly provided with reference to the server 10 and the client 22, respectively, are also intended to being implemented by the method 61.

According to a further example of the present invention, a computer program element is provided, which, when being executed by the server 10 and the at least one client 22, is adapted to carry out the method 61 described above.

According to a further example of the present invention, a computer program element is provided, which, when being executed by the system 60 of the present invention, is adapted to carry out the method 61 described above.

According to a further example of the present invention, a computer-readable medium having stored on a program element is provided, which, when being executed by the server 10 and/or the client 22, is adapted to carry out the method 61 described above.

According to a further example of the present invention, a computer-readable medium having stored on a program element is provided, which, when being executed by the system, is adapted to carry out the method 61 described above.

A computer program may be stored and/or distributed on a suitable medium, such as an optical storage medium or a solid state medium supplied together with or as part of other hardware, but may also be distributed in other forms, such as via the internet or other wired or wireless telecommunication systems.

It has to be noted that embodiments of the invention are described with reference to different subject matters. In particular, some embodiments are described with reference to method type claims whereas other embodiments are described with reference to the device type claims, in particular the server 10 and/or the client 22. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A processing unit or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A server, comprising:
    a server input interface;
    a server processing unit;
    a server storage unit; and
    a server output interface;
    wherein the server input interface is configured to receive a digital image of a slice of biological material, which has been applied with at least one staining substance;
    wherein the server processing unit is configured to classify each pixel of the digital image, wherein a pixel is classified with respect to a staining substance as stained, in case a color property of the pixel is within a predefined property range indicative for an absorption of the respective staining substance, wherein the server processing unit is further configured to calculate at each pixel of the digital image for each staining substance an absorption value $a_{x,y}$ on the basis of the color property of the respective pixel;
    wherein the server storage unit is configured to store the digital image and the classification of the pixels of the digital image;
    wherein the server input interface is further configured to receive a request indicating a region of interest of the digital image from a client; and
    wherein the server output interface is configured to provide one or a combination of the stored classification or other data related to the classification of the pixels at the region of interest to the client.

2. The server of claim 1, wherein the server output interface is configured to provide at least a part of the data stored by the server storage unit as the data related to the classification of the pixels at the region of interest to the client.

3. The server of claim 1, wherein the server input interface is configured to receive for each staining substance an absorption threshold value $a_{th}$ for the region of interest;
    wherein the server processing unit is configured to select the pixels of the stained classified pixels at the region of interest having for at least one staining substance an absorption value larger than the related absorption threshold value as stained selected pixels; and
    wherein the server storage unit is configured to store one or a combination of the stained selected pixels or the absorption values of the stained selected pixels.

4. The server of claim 3, wherein the server processing unit is configured to calculate upon the request a score S, characterizing a staining of the region of interest, as a function of one or a combination of the stored stained selected pixels or the stored absorption values of the stained selected pixels; and wherein the server output interface is configured to provide the score as the data related to the classification of the pixels at the region of interest to the client.

5. The server of claim 1, wherein the server processing unit is configured to determine a plurality of digital tiles, each associated with pixels at a sub- area of a total area of the digital image, such that each pixel of a majority of the pixels of the digital image is associated by at least two tiles;

wherein the server processing unit is configured to quantize the at least one absorption value of each pixel of the digital image into one of a predefined number of absorption levels $a_p$;

wherein the server processing unit is configured to calculate for each tile an absorption frequency vector N for each staining substance, wherein the absorption frequency vectors comprise for each absorption level an entry indicating for the respective staining substance the number of stained pixels of the tile at the respective absorption level; and wherein the server storage unit is configured to store one or a combination of the digital tiles or the absorption frequency vectors.

6. The server of claim 5, wherein the server processing unit is configured to determine the plurality of tiles in one or a combination of a quadtree structure or an integral image structure.

7. The server of claim 5, wherein the server processing unit is configured to determine upon the request a minimum number of tiles of the plurality of stored digital tiles as selected tiles, such that the selected tiles form an integral area corresponding to the region of interest of the digital image; and wherein the server output interface is configured to provide one or a combination of the selected tiles or the absorption frequency vectors of the selected tiles as the data related to the classification of the pixels at the region of interest to the client.

8. The server of claim 5, wherein the server processing unit is configured to determine upon the request a minimum number of tiles of the plurality of stored digital tiles as selected tiles, such that the selected tiles form an integral area corresponding to the region of interest of the digital image;

wherein the server input interface is configured to receive for each staining substance an absorption threshold value for the region of interest;

wherein the server processing unit is configured to select upon the request the entries of the stored absorption frequency vectors of the selected tiles as selected entries, which related absorption levels are each larger than their related absorption threshold value;

wherein the server processing unit is configured to calculate upon the request a score, characterizing a staining at the region of interest, as a function of one or a combination of the selected entries or all entries of the stored absorption frequency vectors of the selected tiles; and wherein the server output interface is configured to provide the score as the data related to the classification of the pixels at the region of interest to the client.

9. A client, comprising:
a client input interface;
a user interface;
a client output interface;
wherein the client input interface is configured to receive a digital image of a slice of biological material, which has been applied with at least one staining substance;

wherein the user interface is configured to display the digital image;

wherein the user interface is configured to receive a selection signal from a user and to select a region of interest of the digital image on the basis of the selection signal;

wherein the client output interface is configured to send a request for data related to a classification of the pixels at the region of interest to a server; and wherein the client input interface is configured to receive upon the request a classification of each of the pixels at the region of interest from the server, each pixel classified with respect to a staining substance as stained, in case a color property of the pixel is within a predefined property range indicative for an absorption of the respective staining substance, each pixel of the digital image for each staining substance comprising an absorption value $a_{x,y}$ on the basis of the color property of the respective pixel.

10. The client of claim 9, wherein the user interface is configured to display the received data related to the classification of the pixels at the region of interest.

11. A method, comprising the following steps:
a) receiving at a server a digital image of a slice of biological material, which has been applied with at least one staining substance;
b) classifying at the server each pixel of the digital image, wherein a pixel is classified with respect to each staining substance as stained, in case a color property of the pixel is within a predefined property-range indicative for an absorption of the respective staining substance, and calculating at each pixel of the digital image for each staining substance an absorption value $a_{x,y}$ on the basis of the color property of the respective pixel;
c) receiving at a client the same digital image of the slice of biological material;
d) displaying the digital image received at the client by a user interface of the client;
e) selecting a region of interest of the digital image at the client upon receiving and on the basis of a selection signal provided by a user via the user interface;
f) sending a request for data related to the classification of the pixels at the region of interest from the client to the server;
g) sending one or a combination of the classification or other data related to the classification of the pixels at the region of interest of the digital image from the server to the client, in case the classifying of step b) has been finished before receiving the request for data related to the classification of the pixels at the region of interest from the client.

12. The method of claim 11, further comprising providing at least a part of the data stored by the server as the data related to the classification of the pixels at the region of interest to the client.

13. The method of claim 11, further comprising receiving at the server for each staining substance an absorption threshold value $a_{th}$ for the region of interest;
selecting at the server the pixels of the stained classified pixels at the region of interest having for at least one staining substance an absorption value larger than the related absorption threshold value as stained selected pixels; and
storing at the server one or a combination of the stained selected pixels or the absorption values of the stained selected pixels.

14. The method of claim 13, further comprising calculating at the server upon the request a score S, characterizing a staining of the region of interest, as a function of one or a combination of the stored stained selected pixels or the stored absorption values of the stained selected pixels; and
provid ing the score as the data related to the classification of the pixels at the region of interest to the client.

15. The method of claim 11, further comprising determining at the server a plurality of digital tiles, each associated with pixels at a sub-area of a total area of the digital image, such that each pixel of a majority of the pixels of the digital image is associated by at least two tiles;
quantizing the at least one absorption value of each pixel of the digital image into one of a predefined number of absorption levels $a_p$;
calculating for each tile an absorption frequency vector N for each staining substance, wherein the absorption frequency vectors comprise for each absorption level an entry indicating for the respective staining substance the number of stained pixels of the tile at the respective absorption level; and
storing one or a combination of the digital tiles or the absorption frequency vectors.

16. The method of claim 15, further comprising determining at the server the plurality of tiles in one or a combination of a quadtree structure or an integral image structure.

17. The method of claim 15, further comprising determining at the server upon the request a minimum number of tiles of the plurality of stored digital tiles as selected tiles, such that the selected tiles form an integral area corresponding to the region of interest of the digital image; and
providing one or a combination of the selected tiles or the absorption frequency vectors of the selected tiles as the data related to the classification of the pixels at the region of interest to the client.

18. The method of claim 15, further comprising determining by the server upon the request a minimum number of tiles of the plurality of stored digital tiles as selected tiles, such that the selected tiles form an integral area corresponding to the region of interest of the digital image;
receiving for each staining substance an absorption threshold value for the region of interest;
selecting upon the request the entries of the stored absorption frequency vectors of the selected tiles as selected entries, which related absorption levels are each larger than their related absorption threshold value;
calculating upon the request a score, characterizing a staining at the region of interest, as a function of one or a combination of the selected entries or all entries of the stored absorption frequency vectors of the selected tiles; and
providing the score as the data related to the classification of the pixels at the region of interest to the client.

19. The method of claim 11, wherein calculating at each pixel of the digital image for each staining substance an absorption value comprises calculating the formula $a_{x,y}=255-(r_{x,y}+g_{x,y}+b_{x,y})/3$, where $r_{x,y}$ relates to a red color component of each pixel at the position (x, y), $g_{x,y}$ relates to a green color component of each pixel at the position (x, y), and $b_{x,y}$ relates to a blue color component of each pixel at the position (x, y).

20. The server of claim 1, wherein the server processing unit is configured to calculate at each pixel of the digital image for each staining substance an absorption value comprises calculating the formula $a_{x,y}=255-(r_{x,y}+g_{x,y}+b_{x,y})/3$, where $r_{x,y}$ relates to a red color component of each pixel at the position (x, y), $g_{x,y}$ relates to a green color component of each pixel at the position (x, y), and $b_{x,y}$ relates to a blue color component of each pixel at the position (x, y).

* * * * *